United States Patent [19]

Schimmel et al.

[11] Patent Number: 4,668,492

[45] Date of Patent: May 26, 1987

[54] PROCESS FOR DEARSENIFYING PHOSPHORIC ACID SOLUTIONS

[75] Inventors: Günther Schimmel; Reinhard Gradl; Gero Heymer, all of Erftstadt, Fed. Rep. of Germany

[73] Assignee: Hoechst Aktiengesellschaft, Fed. Rep. of Germany

[21] Appl. No.: 801,737

[22] Filed: Nov. 26, 1985

[30] Foreign Application Priority Data

Dec. 10, 1984 [DE] Fed. Rep. of Germany ....... 3444975

[51] Int. Cl.$^4$ .................. C01B 25/16; C01B 25/26
[52] U.S. Cl. ................................................ 423/321 R
[58] Field of Search .................................... 423/321 R

[56] References Cited

U.S. PATENT DOCUMENTS

| 3,421,845 | 1/1969 | Peterson | 423/184 |
| 4,146,575 | 3/1979 | Gallistru et al. | 423/321 R |
| 4,485,078 | 11/1984 | Weston et al. | 423/321 R |

FOREIGN PATENT DOCUMENTS 1020015 2/1966 United Kingdom ........... 423/321 R

Primary Examiner—John Doll
Assistant Examiner—Wayne A. Langel
Attorney, Agent, or Firm—Connolly and Hutz

[57] ABSTRACT

Phosphoric acid solutions are dearsenified by treating them with a sulfide and separating the resulting precipitate from the purified solution. The sulfide is at least one compound of the general formula $P_4S_x$ in which x stands for a number of 3 to 10.

10 Claims, No Drawings

PROCESS FOR DEARSENIFYING PHOSPHORIC ACID SOLUTIONS

The present invention relates to a process for dearsenifying a phosphoric acid solution by treating it with a sulfide and separating the resulting precipitate from the purified solution.

As is known, due to its chemical similarity with phosphorus, the element arsenic appears in phosphate ore in association with phosphorus, the relative frequency varying within certain limits (about 5 to 50 ppm As, based on $P_2O_5$).

During the production of so-called thermal phosphoric acid, i.e. during the electrothermal production of elementary phosphorus, its oxidation to phosphorus pentoxide and dissolution of $P_2O_5$ in water, the aresenic remains associated with the phosphorus and is required to be removed from finished phosphoric acid.

In the production of so-called wet-process phosphoric acid, phosphate ore is processed with sulfuric acid, the crude acid is separated from gypsum and the product is further processed or purified, depending on the uses it is put to. This is crude acid which contains the entire quantity of arsenic, based on $P_2O_5$, initially present in the ore. Speaking generally, it is definitely necessary for arsenic to be removed from those acids which are used for making fertilizers or cattle food.

Commerically pure phosphoric acid or phosphoric acid having food quality made from crude phosphoric acid by extraction or precipitation are also required to be free inter alia from arsenic.

The dearsenification can be effected during or after the extraction purification the crude acid is subjected to; in this latter case, the arsenic is removed from the purified acid or purified sodium phosphate solution.

It should be borne in mind however that the arsenic cannot be separated during the actual extracting step but goes forward into the organic extract together with the phosphoric acid.

Customarily, phosphoric acids are therefore dearsenified by subjecting them to treatment with a readily soluble sulfide in order to precipitate and separate the arsenic in form of solid arsenic sulfide. To this end, an alkali metal sulfide, especially sodium sulfide is customarily used, frequently in combination with active carbon (cf. German Specification DE-OS No. 24 29 758).

Normally, 1-2 wgt % sodium sulfide, based on the $P_2O_5$-content of the solution to be dearsenified, is required to be used. Needless to say, correspondingly reduced quantities of chemicals are needed for dearsenifying thermal or extractively purified phosphoric acid.

The process for dearsenifying phosphoric acid with readily soluble sulfides is however beset with various disadvantages:

(1) Relatively large quantities of chemicals have to be used.

(2) In and above the solution, there is a high concentration of toxic $H_2S$ which must be safeguarded against by various technical means.

(3) Elaborate columns are required to be used for effectively carrying out the reaction.

(4) The soluble metal sulfide introduces an additional metal cation into the phosphoric acid solution which is undesirable especially for the production of very pure phosphoric acid.

We have now unexpectedly found that the disadvantages referred to hereinabove do not appear if at least one compound of the general formula $P_4S_x$, in which x stands for a number of 3 to 10, and more especially $P_4S_{10}$, is used as the sulfide.

The dearsenification should conveniently be effected together with the removal of contaminants in form of organic compounds and/or sulfate from the solutions. Phosphoric acid made by an electrothermal process or extractively decontaminated wet-process phosphoric acid should conveniently be treated first with the sulfide $P_4S_x$ and then admixed while stirring with a fine particulate solid adsorbent, e.g. diatomaceous earth or pulverulent active carbon.

Further features of the process of the invention provide: for the dearsenification to be effected at temperatures between 20° and 100° C., preferably between 50° and 80° C.; for the solution to be treated with the sulfide over a period of 0.5 to 5 hours; for crude phosphoric acid to be dearsenified using 0.05-0.5 wgt % $P_4S_x$, and for decontaminated pure acid to be dearsenified using 0.01-0.2 wgt % $P_4S_x$, the percentages being in each case based on the $P_2O_5$-content of the phosphoric acid solution.

An especially efficient variant of the present process provides for the phosphorus sulfide to be first pasted up with little water or phosphoric acid solution and for it to be then added, as an aqueous suspension, to the phosphoric acid solution.

The present process basically provides for crude phosphoric acid or prepurified phosphoric acid or a phosphate salt solution of whatever $P_2O_5$-concentration to be dearsenified. In the case of crude phosphoric acid, it is possible to filter off the arsenic sulfide formed, after addition of a suitable filter aid, which may be selected e.g. from silicates (perlite, diatomaceous earth), active carbon or nay other suitable solid matter.

As already mentioned, it is possible for the arsenic sulfide to be separated during a pretreatment stage phosphoric acid is customarily subjected to during which contaminants are precipitated in sulfate form by the addition, e.g. of a soluble alkaline earth metal compound and/or during which organic contaminants are adsorbed on active carbon.

Summarizing, the process of this invention compares favorably with the prior art methods in respect of the following points:

(1) The use of chemicals in extremely low quantities.

(2) $H_2S$-concentration is very low and so is the potential risk of polluting the environment.

(3) The slow $H_2S$-evolution from $P_4S_x$ permits the reaction to be carried out in a stirring vessel, which means low expenditure of apparatus.

(4) The phosphorus sulfide is solid and therefore easy to use in metered quantities.

(5) Phosphorus sulfide undergoes hydrolysis to phosphoric acid so that foreign materials fail to be introduced into the phosphoric acid solution.

The following Examples illustrate the invention which is naturally not limited thereto.

EXAMPLES 1-5 (cf. Table hereinafter)

Various phosphoric acids were heated at 70° C., admixed with the quantities of $P_4S_{10}$ indicated and stirred for a certain period of time at 70° C. A filter aid was added 10 minutes before the end of the reaction time and the whole was filtered using a pressure filter with precoat layer. The filtered acid was tested for its content of arsenic.

EXAMPLE 6 (cf. Table)

utes. The filtered solution was found to contain 0.7 ppm As.

| | Phosphoric acid | | | | Filter aid | | Stirring | |
|---|---|---|---|---|---|---|---|---|
| Ex. | Origin | wgt % $P_2O_5$ | ppm As | wgt % $P_4S_{10}/P_2O_5$ | Nature | Quantity wgt % $P_2O_5$ | period hours | ppm As in filtrate |
| 1 | Crude acid S.A. | 51.4 | 15 | 0.2 | Perlite | 0.3 | 1 | 0.1 |
| 2 | Crude acid S.A. | 51.4 | 15 | 0.1 | Perlite | 0.2 | 3 | 0.8 |
| 3 | Prepurified green acid | 49.8 | 12 | 0.2 | Perlite | 0.2 | 1 | 0.05 |
| 4 | Extract. purif. acid | 60.5 | 13 | 0.04 | Diatomaceous earth | 0.4 | 1 | 0.05 |
| 5 | Thermal phosphoric acid | 54.5 | 25 | 0.1 | Pulverulent carbon | 0.1 | 2 | 0.05 |
| 6 | Crude acid S.A. | 28.5 | 7 | 0.3 | $BaSO_4$ | n.d. | 1.5 | 0.2 |

In modifying Examples 1 to 5, a crude acid containing 28.5 wgt % $P_2O_5$ (origin: South Africa), 2.4 wgt % $SO_4$ and 7 ppm As was used. Prior to adding $P_4S_{10}$, a barium carbonate quantity stoichiometric to the sulfate content was added and precipitated $BaSO_4$ was used as a filter aid for separating the arsenic. The filtered acid contained 0.01 wgt % $SO_4$.

EXAMPLE 7

In modifying Example 2, the phosphoric acid was admixed with a 30 wgt % phosphorus sulfide suspension in water. After filtration, the dearsenified acid contained 0.4 ppm arsenic.

EXAMPLE 8

This Example describes a dearsenification forming part of a complete pretreatment the acid was subjected to.

Crude acid containing 52 wgt % $P_2O_5$, 2.8 wgt % $SO_4$, 550 ppm $C_{org.}$ and 16 ppm As was heated to 70° C., admixed with 0.5 wgt % (based on $P_2O_5$) pulverulent active carbon and a quantity of hydrate of lime stoichiometric with respect to the sulfate content, and the whole was stirred for 1 hour. Next, 0.3 wgt % $P_4S_{10}$ (based on $P_2O_5$) was added and the suspension was stirred for 1 hour. After having been filtered under pressure, the acid was found to contain 51.6 wgt % $P_2O_5$, 0.3 wgt % $SO_4$, 80 ppm $C_{org.}$, and 0.2 ppm As.

To recover the $P_2O_5$ contained in the filter cake, this latter and pure phosphoric acid (15 wgt % $P_2O_5$) in a quantitative ratio of 1:5 were stirred for one hour at a temperature of up to 50° C. The phosphoric acid filtered off contained 16.6 wgt % $P_2O_5$ and 0.3 ppm As.

EXAMPLE 9 (comparative Example)

The dearsenification was effected as in Example 4 however with the use of 0.2 wgt % (based on $P_2O_5$) solid sodium sulfide ($Na_2S.9H_2O$). The filtered acid was found to still contain 7 ppm As.

EXAMPLE 10

An extractively purified sodium phosphate solution containing 32 wgt % $P_2O_5$ and 25 ppm As and presenting a Na/P-ratio of 1.33:1 (pH=5.5) was used. 0.1 wgt % $P_4S_{10}$ (based on $P_2O_5$) was added and the whole was stirred for 3 hours at 70° C.; next, 0.2 wgt % perlite was added and the whole was stirred for a further 10 min-

We claim:

1. In a process for dearsenifying a phosphoric acid solution by treating it with a sulfide and separating the resulting precipitate from the purified solution the improvement which comprises: using, as the sulfide, at least one compound of the general formula $P_4S_x$ in which x stands for a number of 3 to 10.

2. The process as claimed in claim 1, wherein $P_4S_{10}$ is used as the sulfide.

3. The process as claimed in claim 1, wherein the dearsenification is effected together with the removal of organic contaminants or sulfate or both organic contaminants and sulfate from the solution.

4. The process as claimed in claim 1, wherein phosphoric acid made by an electrothermal process or extractively purified wet-process phosphoric acid is dearsenified by first subjecting the respective phosphoric acid to treatment with the sulfide $P_4S_x$ and then admixing it, while stirring, with a fine-particulate adsorbent.

5. The process as claimed in claim 1, wherein the dearsenification is effected at temperatures between 20° and 100° C.

6. The process as claimed in claim 5, wherein the dearsenification is effected at temperatures between 50° and 80° C.

7. The process as claimed in claim 1, wherein the solution is treated with the sulfide over a period of 0.5 to 5 hours.

8. The process as claimed in claim 1, wherein crude phosphoric acid is dearsenified using 0.05 to 0.5 wgt % $P_4S_x$, and pure phosphoric acid is dearsenified using 0.01 to 0.2 wgt % $P_4S_x$, the percentages being in each case based on the $P_2O_5$-content of the respective phosphoric acid solution.

9. The process as claimed in claim 1, wherein an aqueous suspension of the sulfide $P_4S_x$ is used.

10. A process for dearsenifying a phosphoric acid solution comprising:
treating the solution with at least one compound of the general formula $P_4S_x$, in which x stands for a number from 3 to 10, thereby forming an arsenic sulfide precipitate, and
separating said precipitate from the treated solution to obtain the substantially dearsenified phosphoric acid solution.

* * * * *